United States Patent [19]

Abrams

[11] Patent Number: 4,751,615
[45] Date of Patent: Jun. 14, 1988

[54] PAGE LIGHT

[75] Inventor: Martin Abrams, S. Barrington, Ill.

[73] Assignee: International Marketing Concepts, Inc., Glenview, Ill.

[21] Appl. No.: 893,972

[22] Filed: Aug. 7, 1986

[51] Int. Cl.⁴ .................................... F21V 33/00
[52] U.S. Cl. ............................ 362/31; 362/98; 40/546
[58] Field of Search .............. 362/98, 99, 31, 32, 362/26, 29, 30; 350/286, 96.1; 206/371; 40/546

[56] References Cited

U.S. PATENT DOCUMENTS

| 2,358,203 | 9/1944 | Bert | 40/546 |
| 2,561,885 | 7/1951 | Prideaux et al. | 40/546 |
| 3,500,034 | 3/1970 | Bissell | 362/98 |

FOREIGN PATENT DOCUMENTS

| 525515 | 8/1953 | Belgium | 362/31 |
| 1278703 | 11/1961 | France | 362/31 |
| 402825 | 6/1933 | United Kingdom | 362/31 |
| 1232977 | 5/1971 | United Kingdom | 362/98 |

OTHER PUBLICATIONS

"Piping Light with Acrylic Materials" Pearson, *Modern Plastics*, Aug. 1946.

Primary Examiner—E. Rollins Cross
Assistant Examiner—D. M. Cox
Attorney, Agent, or Firm—Dressler, Goldsmith, Shore, Sutker & Milnamow

[57] ABSTRACT

A personal reading and writing light or illumination device having a tapered transparent body with an opening at one end for receiving an illumination source and with a discontinuity adjacent the opening to improve uniformity of illumination of the body and of a reading or writing work surface in contact with the body. The ends and sides of the body are configured or otherwise treated to maximize reflection and minimize illumination of adjacent areas.

21 Claims, 1 Drawing Sheet

PAGE LIGHT

FIELD OF INVENTION

The present invention relates to portable, personal lights for use as reading and writing lights, and more particularly, to a personal page light or illumination device which is designed to illuminate one or two pages for reading or writing while minimizing the light impingement on, and the illumination of, adjacent areas.

BACKGROUND OF THE INVENTION

Various types of portable lamps and lights exist which are designed to illuminate reading or writing material while minimizing extraneous and unwanted illumination of adjacent areas. Many such reading lights are sufficiently low-powered so that they can be powered by batteries, as well as by an AC power source.

For the most part, such lights are designed to be attached, clamped, or otherwise supported either on a piece of furniture adjacent to the user, to a portion of a book to be read, or to a support for the book or paper, such as a clip board. The light source is spaced from and disposed above the material being read and projects down thereon to provide illumination.

In order to minimize stray illumination, such lights may: (1) be small so that stray illumination is not bothersome; (2) be contained within a housing or shade designed to block stray illumination; and/or (3) utilize a focused light source. It would seem that these lights would be more effective at some angles than others. For example, if one is working or observing the illuminated object at a shallow angle, the light source itself is often in line with the eyes, thereby projecting directly into and shining into the eyes of a user rather than being shaded therefrom. In an attempt to avoid this problem, some lights incorporate complicated linkages and interconnections so that the light can be twisted and turned to avoid direct illumination of the eyes at various working angles. While this may achieve, in many instances, the desired result, it often requires repeated manipulations with changes in the relative positions of the user and the work surface, e.g., a book or writing surface. Such constructions also add to the cost and expense of producing such lights.

For this reason, a page light has been marketed which consists of a tapered body of plastic material having a pair of major planar surfaces and a pair of side walls therebetween and an end wall at the one end thereof. At the one end, a pair of bulbs are disposed in a pair of lateral recesses for the purpose of illuminating the plastic body. A work surface, such as a page of a book, is illuminated by placement in contact with one of the major surfaces thereof.

In order to provide sufficient illumination for use, the device incorporates a pair of 12-volt elongated linear bulbs. Of significance is the fact that the light sources utilized becomes so hot that it is dangerous to touch the device in the area adjacent to the light sources. As a result, the product is not safe and is not capable of use as intended with any degree of safety.

Additionally, in spite of the two light sources, illumination of the work surface or page in contact with the major surface is not satisfactory in that there are light and dark areas in the nature of interference patterns which detract from the desired use of the device. Furthermore, a substantial amount of light passes out of the side walls to undesirably illuminate the surrounding area.

Such light patterns are known to exist. One technique for providing illumination through the surfaces of a clear plastic body is to roughen or score the surface thereof. An example of such scoring is illustrated in U.S. Pat. No. 3,829,675, in which a roughened outer surface of a cylindrical tube having a light source at one end is utilized to control illumination in an area remote from the light source. One problem with this technique, however, is that the roughened surface precludes use of a page illumination device as a reading light in which a page of a book or other material is read through the device, which is one of the intended uses of such personal reading lights. This, therefore, is not a satisfactory technique for implementing desired illumination.

It might be possible for very high technology computer-controlled systems to possibly provide a very fine surface treatment which would achieve the desired result. However, the cost of such high technology finely-controlled treatments would be so high that the product could not be produced and marketed at a cost that would allow its sale to the consumer for use as a personal reading and writing light.

Thus, it would be desirable to provide a type of page light and illumination device capable of illuminating a work surface, such as a page to be read or paper for writing, which would provide constant and uniform illumination, which would minimize extraneous illumination, which would not create safety hazards in the nature of excess power or high temperatures, and which would be low in cost and simple in design.

SUMMARY OF INVENTION

In accordance with the present invention, there is provided a page light, or illumination device, incorporating a relatively small, low-powered bulb which, because of its configuration, provides maximum illumination for the page or work surface being illuminated. The illumination device incorporating the present invention can illuminate a writing surface in the event that one desires to write, as well as material to be read. The page light incorporating the present invention utilizes a minimum of parts, and no moving components. It is simple, relatively inexpensive, and reliable.

In accordance with the present invention, there is provided a body of transparent material, such as acrylic or lucite, which, when exposed to a source of illumination disposed adjacent one end thereof, is itself illuminated and simultaneously illuminates a page or work surface in contact with one of the major surfaces thereof. In order to maximize illumination, the sides of the body are configured and/or treated to insure maximum reflection of the light therewithin, and to minimize transmission of the light from internally of the transparent body to adjacent areas.

In addition, in order to provide generally uniform illumination throughout the entire body and thereby uniformly illuminate the work surface—the page to be read or paper on which to write—the body is formed with, or otherwise incorporates, a discontinuity in the vicinity of the light source. The discontinuity is disposed between the light source and the major portion of the body, or at least that portion of the body adapted to contact the work surface.

The page light or illumination device incorporating the present invention effectively and efficiently illuminates the area which is desired to be illuminated—the work surface in contact with the major surface thereof—while simultaneously minimizing illumination in the adjacent areas through the ends and edges thereof.

Numerous other advantages and features of the present invention will become readily apparent from the following detailed description of the invention and the embodiments thereof, from the claims, and from the accompanying drawings in which the details of the invention are fully and completely disclosed as a part of this specification.

DESCRIPTION OF SPECIFIC EMBODIMENT

Figure 1:
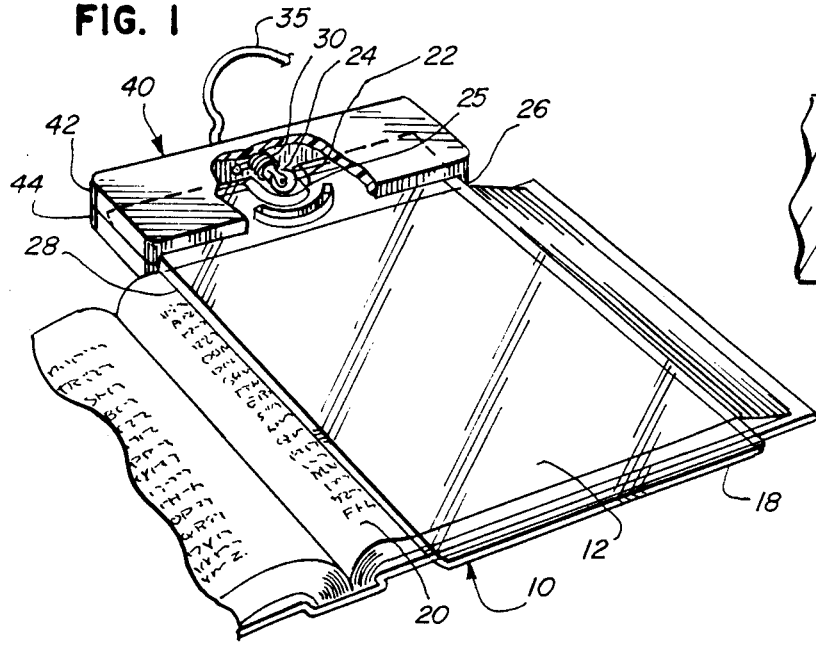
FIG. 1 is a perspective view of a page illumination device incorporating the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

The page light illumination device incorporating the present invention incorporates a generally transparent body 10 of acrylic or other material, such as lucite, capable of illumination when exposed to a source of illumination located along or adjacent to one end thereof. The body 10 may conveniently be shaped as a rectangle having opposed major surfaces 12, 14 thereof, the thickness of which may vary from the thickest point at or adjacent to one end 16 of about 375 thousandths of an inch and a thickness at its thin end 18 of about 60 thousandths of an inch. The tapered or wedge-shaped body 10 provides for a controlled escape of the light to effect a generally consistent and uniform illumination of a work surface 20 in contact with major surfaces 12, 14 of body 10. A body having parallel major surfaces would not provide uniform illumination along its length, as does the tapered or wedge-shaped body incorporated in the present invention. In the illustrated embodiment, the included angle or taper is somewhat greater than two degrees.

The wedge-shaped body 10 is provided at its thickest end 16 with a notch or opening 22 adapted to receive as a source of illumination, light bulb 24 for providing the illumination. The wall 25 of the notch 22 is generally curved so that the wall 25 surrounding the notch is generally equidistant from the light source 24 to reduce reflection of the light off the surface of the wall 25. If desired, the surface of the notch wall 25 can be concave, with the radius of curvature being equal to the distance between the light source 24 and the wall 25 to improve light penetration into the body 10. It is believed that a higher percentage of light emanating from the source 24 may enter the body 10 at low angles of incidence when the surface is concave, because a larger percentage of light would appear or impinge on the wall 25 perpendicular to the surface thereof.

Figure 4:
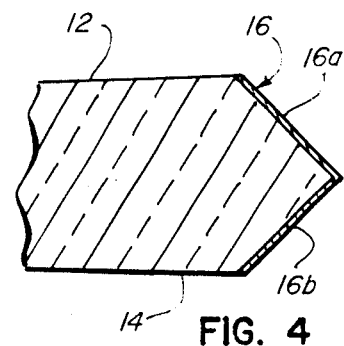
FIG. 4 is an enlarged sectional view taken along lines 4—4 of FIG. 2.
Figure 2:
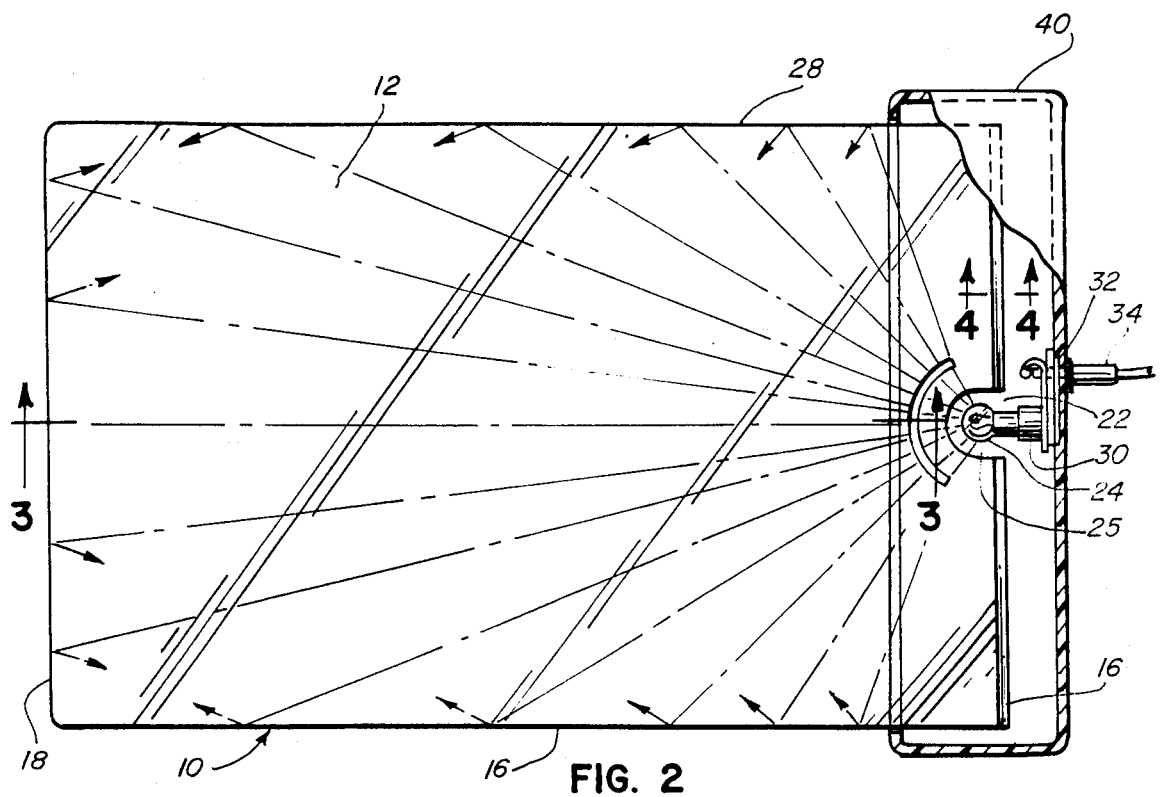
FIG. 2 is a plan view thereof with portions broken away.
Figure 3:
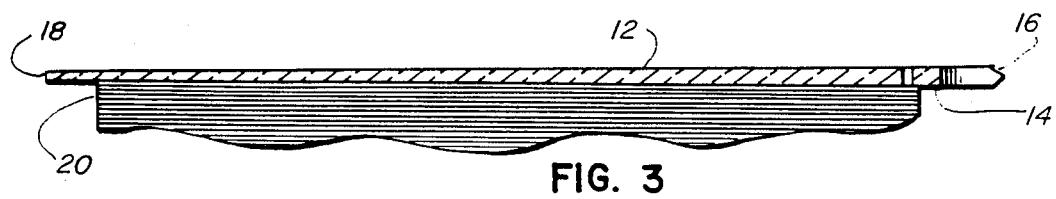
FIG. 3 is a sectional view taken along lines 3—3 of FIG. 2.

It is desirable to effect as much reflection off the ends 16, 18 and the sides 26, 28 of the body 10 as possible. There is very little useful purpose in providing illumination at the upper end 16 or, as a matter of fact, at the other end 18 or at the sides 26, 28 of the tapered wedge-shaped body 10. In order to provide for maximum internal reflectivity, the upper end wall 16 of the body 10 is formed in the shape of a reflecting prism, with wall portions 16a, 16b in the nature of a Porro prism (see FIG. 4). The light impinges on the surfaces of the prism at angles greater than the critical angle to achieve substantially total reflection.

Since the light impinging at the end 18 and the sides 26, 28 may not be impinged at angles greater than the critical angle, the end 18 and the sides 26, 28 of the wedge-shaped body 10 may be covered with suitable reflective material. For example, they can be metalized with a gold or silver reflective metal material, so that the light reflects back into the body from the ends 16, 18 and the sides 26, 28.

The tapering wedge shape of the body 10 provides for illumination through the two opposed major surfaces 12, 14 thereof. As shown in the drawings, one surface is designed to rest on a work surface 20, such as a book to be read, providing illumination thereof for a user who can conveniently read through the body 10 without undesirably illuminating the surrounding areas. Alternatively, the page light can be used as a writing light with a paper or work surface laid over one of the surfaces 12, 14 thereof to enable one to write in darkened spaces, once again, without disturbing surrounding areas.

A light suitable for producing the desired illumination may be any one that can be operated off of batteries or, alternatively, off a comparable AC source. One embodiment of the present invention has successfully operated with a No. 418 miniature 6 volt bulb energized by 4 C-batteries. The bulb is supported in a suitable lamp holder assembly 30, which includes a jack 32. A plug 34 attaches to wire 35 connecting the light source 24 to batteries or an A-C power base (not shown). The lamp holder assembly 30 is mounted in a cover frame 40 at the thicker, upper end of the wedge-shaped body 10. The frame 40 is composed of a pair of molded body halves 42, 44, generally rectangular in shape, having the desired aesthetic configuration amd assembled on both sides of the wedge-shaped acrylic illuminating body 10, and suitably fastened thereto. The end of the assembled head cover 40 is suitably configured to receive the lamp holder assembly 30 and the bulb 24. When inserted and attached to the cover 40, the bulb is positioned internally of the notch or opening 22 in the wedge-shaped light body 10 to provide the desired illumination.

The page light of the present invention is capable of providing sufficient illumination for reading a page in a totally dark room and yet, simultaneously, requires sufficiently low power to minimize heating of the device. The illumination device of the present invention does not produce a sufficient amount of heat to be dangerous, so one can touch the light bulb itself, as well as the entire device, without discomfort. Safety is, of course, imperative to permit the use of the device under a variety of conditions, to eliminate discomfort, and to simultaneously provide sufficient light for use.

Thus, there has been disclosed an illumination device capable of providing sufficient light to facilitate either reading and/or writing on surfaces or pages in contact with the major surfaces of the wedge-shaped plastic body, made of a material capable of transmitting light internally thereof, which light escapes through the major surfaces, and is totally reflected from the edge surfaces thereof. This reflectivity provides for increased illumination by the light source, while minimizing the escape of light in undesired directions.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A page illumination device comprising:
a three-dimensional body of substantially transparent material, including generally planar first and second major surfaces, opposed side walls and opposed end walls, one of the major surfaces of said body being adapted to be placed in contact with a work surface to effect illumination thereof while minimizing illumination of the surrounding environment;
a source of illumination for said body disposed adjacent to one of said end walls; and
a discontinuity in said body spaced from said one end wall and located in the vicinity of said illumination source for enhancing the uniformity of the illumination of said body and thereby the work surface in contact with said one of the major surfaces of said body and for minimizing undesired dark areas therein.

2. An illumination device as claimed in claim 1, wherein said body is thickest adjacent said one end wall.

3. An illumination device as claimed in claim 2, wherein the thickness of said body tapers generally uniformly from said one end wall to the other of said end walls.

4. An illumination device as claimed in claim 1, including a single opening formed in and extending into said body from said one end wall;
said illumination source being disposed in said opening.

5. An illumination device as claimed in claim 4, wherein said one end wall is shaped as a prism in cross-section for reflecting light emanating from said illumination source back into said body.

6. An illumination device as claimed in claim 4, wherein said opening is located substantially midway between said side walls.

7. An illumination device as claimed in claim 1, wherein said one end wall is configured to maximize reflection of light emanating from said illumination source.

8. An illumination device as claimed in claim 1, wherein the surfaces of said side walls are reflective to reflect light emanating from said illumination source back into said body to minimize illumination of adjacent areas through said side walls.

9. An illumination device as claimed in claim 8, including a reflective coating on said side walls.

10. An illumination device as claimed in claim 1, wherein said illumination source is sufficiently low powered to be thermally safe to the touch.

11. An illumination device as claimed in claim 1, including means covering said one end and adjacent portions of both of said major surfaces of said body and thereby said illumination source and said discontinuity for shielding said source and discontinuity from view.

12. An illumination device as claimed in claim 11, including means attaching said illumination source to said cover means for supporting said source in position adjacent said one end.

13. A page illumination device comprising:
a three-dimensional tapered body of substantially transparent material, including generally planar first and second major surfaces, opposed side walls and opposed end walls, one of the major surfaces of said body being adapted to be placed in contact with a work surface to effect illumination thereof while minimizing illumination of the surrounding environment;
the thickness of said body tapering generally uniformly from one of said end walls to the other of said end walls;
an opening formed in said one end of said body and extending into said body from said one end wall;
a source of illumination for said body disposed in said opening adjacent to said one end wall;
a discontinuity formed in and extending through said body in the vicinity of and adjacent to said illumination source opening for enhancing the uniformity of the illumination of said body and thereby the uniformity of the illumination of the work surface in contact with said one major surface of said body by minimizing undesired dark areas therein at locations spaced away from said discontinuity; and
means extending over a portion of said major surfaces of said body to cover said opening, said discontinuity and said illumination source.

14. An illumination device as claimed in claim 13, including means covering said one end and adjacent portions of both of said major surfaces of said body and thereby said illumination source, said opening and said discontinuity for shielding said source, said opening and discontinuity from view.

15. An illumination device as claimed in claim 14, including means attaching said illumination source to said cover means for supporting said source in said opening.

16. A page illumination device comprising:
a three-dimensional body of substantially transparent material, including generally planar first and second major surfaces, opposed side walls and opposed end walls, one of the major surfaces of said body being adapted to be placed in contact with a work surface to effect illumination thereof while minimizing illumination of the surrounding environment;
a source of illumination for said body disposed adjacent to one of said end walls; and
a discontinuity in said body in the vicinity of said illumination source for enhancing the illumination of said body and thereby the work surface and for minimizing undesired dark areas therein;
said discontinuity being defined by a slot extending through said body from one of said major surfaces to the other and disposed adjacent to said source of illumination.

17. An illumination device as claimed in claim 16, wherein said slot is disposed between said illumination device and the portion of said body adapted to contact the work surface.

18. An illumination device as claimed in claim 16, wherein said slot is generally arcuate.

19. A page illumination device comprising:

a three-dimensional tapered body of substantially transparent material, including generally planar first and second major surfaces, opposed side walls and opposed end walls, one of the major surfaces of said body being adapted to be placed in contact with a work surface to effect illumination thereof while minimizing illumination of the surrounding environment;

the thickness of said body tapering generally uniformly from one of said end walls to the other of said end walls;

an opening formed in said one end of said body and extending into said body from said one end wall;

a source of illumination for said body disposed in said opening adjacent to said one end wall;

a discontinuity formed in and extending through said body in the vicinity of and adjacent to said illumination source opening for enhancing the illumination of said body and thereby the work surface by minimizing undesired dark areas therein, said discontinuity being defined by a slot extending through said body from one of said major surfaces to the other and disposed adjacent to said source of illumination; and means extending over a portion of said major surfaces of said body to cover said opening, said discontinuity and said illumination source.

20. An illumination device as claimed in claim 19, wherein said slot is disposed between said illumination device and the portion of said body adapted to contact the work surface.

21. An illumination device as claimed in claim 19, wherein said slot is generally arcuate.

* * * * *